United States Patent [19]

Harada

[11] Patent Number: 4,553,820

[45] Date of Patent: Nov. 19, 1985

[54] KEYBOARD SWITCH WITH A MESH OF FIBERS

[75] Inventor: Yuji Harada, Tokyo, Japan

[73] Assignee: Canon Kabushiki Kaisha, Tokyo, Japan

[21] Appl. No.: 517,631

[22] Filed: Jul. 27, 1983

[30] Foreign Application Priority Data

Aug. 13, 1982 [JP] Japan .................................. 57-140672

[51] Int. Cl.⁴ ............................................. G02F 1/133
[52] U.S. Cl. ............................ 350/331 R; 350/276 R; 350/339 D
[58] Field of Search ........... 350/345, 334, 337, 339 D, 350/339 R, 338, 331 R, 276 R; 400/479, 490, 494; 340/712, 765, 785

[56] References Cited

U.S. PATENT DOCUMENTS

| | | | |
|---|---|---|---|
| 3,736,047 | 5/1973 | Gelber et al. | 350/338 |
| 4,017,848 | 4/1977 | Tannas | 350/334 X |
| 4,105,292 | 8/1978 | Conder et al. | 350/334 X |
| 4,264,147 | 4/1981 | Baur et al. | 350/339 D X |
| 4,398,804 | 8/1983 | Yokoi | 350/337 |
| 4,415,236 | 11/1983 | Perregaux | 350/339 D X |

*Primary Examiner*—John K. Corbin
*Assistant Examiner*—David Lewis
*Attorney, Agent, or Firm*—Fitzpatrick, Cella, Harper & Scinto

[57] ABSTRACT

This invention discloses a keyboard switch with display function composed of two transparent sheets constituting a pressure operable switch and placed on a display unit. The upper of two transparent sheets is provided with an unflat top surface for avoiding unnecessary reflection.

7 Claims, 5 Drawing Figures

KEYBOARD SWITCH WITH A MESH OF FIBERS

BACKGROUND OF THE INVENTION

1. Field of the Invention

The present invention relates to a keyboard switch in which the actuating part and the surrounding part thereof are substantially positioned on the same plane.

2. Description of the Prior Art

Recent technical progresses in the field of electronic parts have realized thin small keyboard switches. The actuating stroke of the keyboard switch, which conventionally was in a range of 1 to 4 mm, has been made shorter to a range of 0.1 to 0.5 mm. Such keyboard switch is surfacially covered with a flexible sheet, and the symbols representing switch functions or characters or numerals are either printed on the inner surface of said sheet or displayed by means of light-emitting diodes or liquid crystal display devices. Such keyboard switches are generally called flat keyboard switches. FIG. 1 shows the structure of a display keyboard utilizing such a flat keyboard switch in combination with a liquid crystal display device for displaying symbols corresponding to the switches.

As shown in FIG. 1, the conventional flat keyboard switch FKB is surfacially covered with a flexible glossy sheet, which may be smeared with the stain or sweat of the finger upon contact at the data input operation. Such a smear or stain often becomes noticeable to the operator when the light reflected on said sheet enters the eye of the operator, thus hindering the observation of the symbols displayed on a liquid crystal display unit DSP and giving an unpleasant feeling to the operator.

SUMMARY OF THE INVENTION

In consideration of the foregoing, the object of the present invention is to provide a keyboard switch provided with antireflective treatment on the actuating part, or on the actuating part and on the surrounding area thereof to randomly reflect the light incident at an arbitrary angle even in the presence of a stain or sweat of finger deposited during the key operations, thereby facilitating the observation of the symbols displayed corresponding to the keyboard switches and rendering such stains less conspicuous to the operator, to ensure pleasant operation.

Another object of the present invention is to provide a keyboard switch in which an upper sheet is treated to obtain a non-flat surface.

Still another object of the present invention is to provide a keyboard switch in which an upper sheet is provided thereon with an antireflective member.

DETAILED DESCRIPTION OF THE PREFERRED EMBODIMENTS

Now the present invention will be clarified in detail by embodiments thereof shown in the attached drawings.

Figure 1:
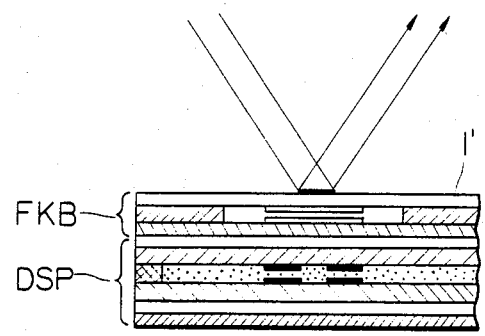
FIG. 1 is a cross-sectional view of a conventional keyboard switch.
Figure 2:
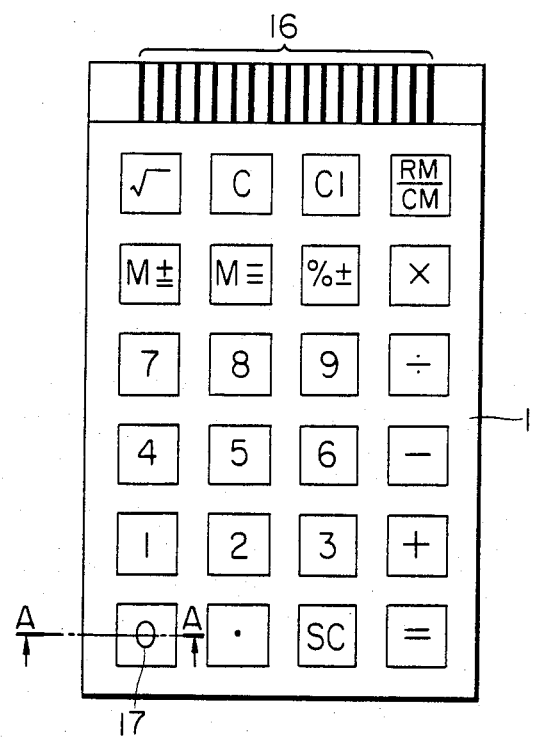
FIG. 2 is a plan view of an embodiment of the present invention.
Figure 3:
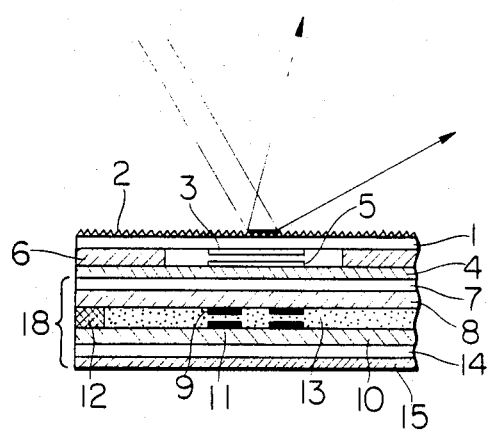
FIG. 3 is a cross-sectional view thereof.

FIG. 2 is a plan view of an electronic apparatus equipped with a keyboard switch according to the present invention, and FIG. 3 is a cross-sectional view along a line A—A shown in FIG. 2. In these figures there are shown a surfacial flexible printed-circuit board 1 composed of a transparent plastic film which is subjected to a treatment to obtain a coarse surface 2 and is provided with a transparent electrode 3 on the other surface, the above-mentioned surface being treated to obtain a matted or undulating surface and the above-mentioned transparent electrode 3 being composed of a thin layer of indium oxide, tin oxide, gold, aluminum, etc.; a transparent printed-circuit board 4 composed of a plastic film provided with a transparent electrode 5 on a surface thereof, the above-mentioned transparent electrode 5 being composed of a thin layer of indium oxide, tin oxide, gold, aluminum, etc.; a spacer for separating the surfacial printed-circuit board 1 from the transparent printed-circuit board by a determined distance; an upper polarizing filter 7; an upper glass plate 8 provided with a transparent electrode 9 on a surface thereof, the above-mentioned transparent electrode 9 being composed of a thin layer of indium oxide, tin oxide, etc.; a lower glass plate 10 provided on a surface thereof with a transparent electrode 11 in a position corresponding to the transparent electrode 9, the transparent electrode 11 being composed of a thin layer of indium oxide, tin oxide etc.; a frame spacer 12 supporting the upper glass plate 8 and the lower glass plate 10 at a determined distance and sealing liquid crystal substance 13 therein; a lower polarizing filter 14 adhered to the bottom surface of the lower glass plate 10; and a reflecting plate 15 adhered to said lower polarizing filter 14. In response to a signal supplied to an input terminal 16 (shown in FIG. 2) from the electronic apparatus, the liquid crystal substance positioned corresponding to the transparent electrodes 9, 11 is oriented to display for example a numeral 17 shown in FIG. 2 according to the form of the transparent electrodes. The operator can observe the numeral 17 displayed on the liquid crystal display device 18 through the surfacial printed circuit board 1, transparent electrodes 3, 5 and transparent printed circuit board 4. While thus observing the displayed numeral and symbols, the operator can select and touch a desired numeral or a symbol with a finger, whereby the finger contact with the coarse treated surface 2 shown in FIG. 2 eventually leaves stain or sweat thereon. Upon further pressing the surfacial printed circuit board 1 and the transparent electrode 3 are simultaneously bent until said transparent electrode 3 touches the transparent electrode 5, whereby electrical contact is made therebetween to achieve desired input operation. When the finger is lifted the surfacial printed circuit board 1 and the transparent electrode 3 return to the original position by the elasticity of said surfacial printed circuit board 1. The stain or sweat deposited on the surface is not conspicuous, while the symbol displayed on the liquid crystal display device 18 is easily recognizable, since the light incoming at an arbitrary angle is randomly reflected by the coarse treated surface 2 as shown in FIG. 3 and the operator observes only a part of the thus randomly reflected light. Consequently the operator can comfortably manipulate the flat keyboard switch.

Figure 5:
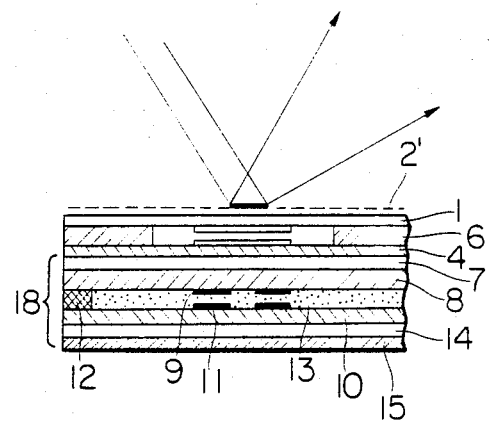
FIG. 5 is a cross-sectional view thereof.
Figure 4:
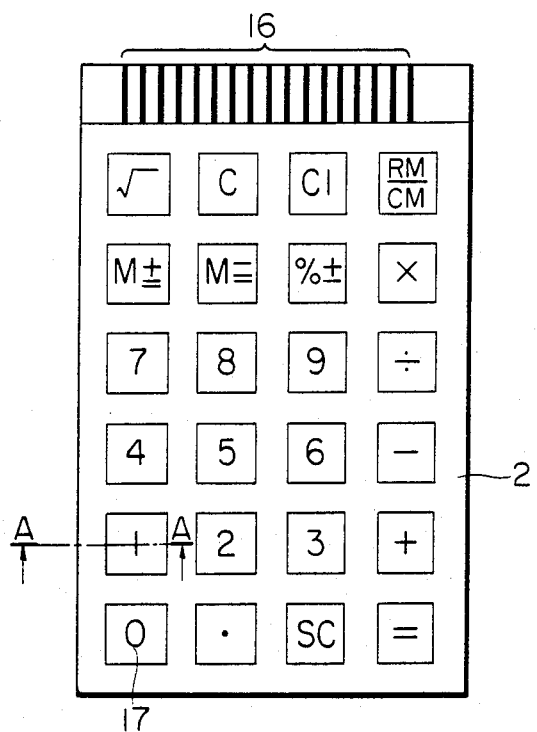
FIG. 4 is a plan view of another embodiment of the present invention.

FIG. 4 is a plan view of another embodiment of the present invention while FIG. 5 is a cross sectional view thereof. Said other embodiment is different from the foregoing embodiment shown in FIGS. 2 and 3 in that the transparent plastic film constituting the surfacial printed circuit board 1 is provided, on a surface thereof, with an anti-reflective net 2' composed of a grating of filaments of plastic or of metal wires to obtain an effect similar to that in the embodiment shown in FIGS. 2 and 3. In the foregoing embodiments a liquid crystal display device 18 is employed for displaying the function of each switch in the flat keyboard switches, but other display devices such as a light-emitting diode array, an electroluminescence device or a fluorescent display device may be employed for the same purpose.

What I claim is:

1. A display keyboard comprising:
   means for displaying information to be entered; and
   a keyboard provided on said display means and including:
      a first transparent sheet having at least first and second opposite surfaces;
      a coarse mesh layer comprising filaments provided on said first surface of said first transparent sheet, said coarse mesh layer being disposed to be contacted by an operator's finger;
      a second transparent sheet provided parallel to and spaced a predetermined distance apart from said second surface of said first transparent sheet; and
      a pair of transparent electrodes respectively provided on said first and second transparent sheets so as to be opposed to each other;
      wherein the display information is visible through said first and second transparent sheets and said pair of transparent electrodes.

2. A display keyboard according to claim 1, wherein said coarse mesh layer is a net of transparent synthetic resin.

3. A display keyboard according to claim 1, wherein said coarse mesh layer is a thin metal net.

4. A display keyboard according to claim 1, wherein said display means is an electro-optical display.

5. A display keyboard according to claim 1, wherein said electro-optical display is a liquid crystal display device.

6. A display keyboard according to claim 1, wherein said keyboard further comprises a spacer for separating said opposite transparent electrodes for each other.

7. A display keyboard according to claim 1, wherein said transparent electrodes constitute a switch for entering the information to be displayed on said display means.

* * * * *